US012106375B2

(12) United States Patent
Lebor (10) Patent No.: US 12,106,375 B2
(45) Date of Patent: Oct. 1, 2024

(54) INSURANCE OPTIMAL QUOTE RECOGNITION

(71) Applicant: AmTrust Financial Services, Inc., New York, NY (US)

(72) Inventor: Michael Lebor, Lawrence, NY (US)

(73) Assignee: AmTrust Financial Services, Inc., New York, NY (US)

( * ) Notice: Subject to any disclaimer, the term of this patent is extended or adjusted under 35 U.S.C. 154(b) by 0 days.

(21) Appl. No.: 17/174,613

(22) Filed: Feb. 12, 2021

(65) Prior Publication Data

US 2021/0248682 A1  Aug. 12, 2021

Related U.S. Application Data (60) Provisional application No. 62/975,353, filed on Feb. 12, 2020.

(51) Int. Cl.
*G06Q 40/08* (2012.01)
*G06Q 20/08* (2012.01)
*G06Q 30/016* (2023.01)

(52) U.S. Cl.
CPC .......... *G06Q 40/08* (2013.01); *G06Q 20/085* (2013.01); *G06Q 30/016* (2013.01)

(58) Field of Classification Search
CPC ....... G06Q 20/08; G06Q 20/085; G06Q 40/08
USPC .......................................................... 705/4
See application file for complete search history.

(56) References Cited

U.S. PATENT DOCUMENTS

| | | | | |
|---|---|---|---|---|
| 7,945,497 B2 * | 5/2011 | Kenefick | ................ | G06Q 40/08 705/35 |
| 8,566,131 B1 * | 10/2013 | Wu | ........................ | G06Q 40/08 705/4 |
| 8,577,699 B1 * | 11/2013 | Diener | ................... | G06Q 40/08 705/26.1 |
| 2002/0188484 A1 * | 12/2002 | Grover | ................... | G06Q 40/08 705/4 |

FOREIGN PATENT DOCUMENTS

WO     WO-0180128 A2 * 10/2001 ............. G06Q 40/02

OTHER PUBLICATIONS

Authors: Yi-Wen Wu et al: Optimal investments strategy for whole life insurance policies; IEEE Xplore; Date of Conference: Apr. 26-28, 2014; (Year: 2014).*

(Continued)

*Primary Examiner* — Bruce I Ebersman
*Assistant Examiner* — Hatem M Ali
(74) *Attorney, Agent, or Firm* — McDonald Hopkins LLC (57) ABSTRACT

Insurance optimal quote recognition is provided to customers or potential customers seeking insurance. The customer contacts an agent about an insurance policy. The agent provides a system with contact information of the customer. The system sends a link, a notification, and/or the like to the customer via the contact information. The customer follows the link and provides a snapshot, digital version, or other documentation of a present or lapsed insurance policy. The system analyzes and extracts data about the policy and/or the customer using optimal quote recognition. The system generates an insurance policy quote using the extracted data. The policy quote is sent to the customer. The customer can accept the quote and bind the insurance policy. A notification and/or commission is sent to the agent upon binding.

9 Claims, 10 Drawing Sheets

(56) References Cited

OTHER PUBLICATIONS

Authors: Mannat Doultani et al: Smart Underwriting—A Personalized Virtual Agent; Proceedings of the Fifth International Conference on Intelligent Computing and Control Systems (ICICCS 2021): May 6-8, 2021 (Year: 2021).*

Authors: Yi-Wen Wu et al: Optimal investments strategy for whole life insurance policies; IEEE Xplore; Date of Conference: Apr. 26-28, 2014; (Year: 2014) (Year: 2014).*

Authors: Mannat Doultani et al: Smart Underwriting—A Personalized Virtual Agent; Proceedings of the Fifth International Conference on Intelligent Computing and Control Systems (ICICCS 2021): May 6-8, 2021 (Year: 2021) (Year: 2021).*

* cited by examiner

INSURANCE OPTIMAL QUOTE RECOGNITION

CROSS-REFERENCE TO RELATED APPLICATION

This application claims the benefit of and priority to U.S. Provisional Patent Application No. 62/975,353 filed on Feb. 12, 2020 and titled "INSURANCE OPTIMAL QUOTE RECOGNITION," the entirety of which is incorporated herein by reference.

BACKGROUND

Small insurance policies face barriers for both insurance agents and customers. Small insurance policies often encounter lack of willingness to engage by insurance agents and the end user policy holder. The lack of willingness may stem from having to enter personal information into multiple systems, platforms, and websites for a small gain.

Small Commercial Policies (e.g. those under $5,000 Annual Premium) are usually very time consuming while the commissions are not sufficient to make the effort worthwhile for insurance agents. The effort includes significant data entry and back and forth data verification, and as a result creates an environment of an inefficient and unprofitable business segment.

Further, customer or policy holders usually enter certain information or provide specific information to the agent when they do not fully understand their current policy or how to extract the correct policy information from their existing insurance policy documents.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Insurance optimal quote recognition is provided to customers or potential customers seeking insurance. The customer contacts an agent about an insurance policy. The agent provides a system with contact information of the customer. The system sends a link, a notification, and/or the like to the customer via the contact information. The customer follows the link and provides a snapshot, digital version, or other documentation of a present or lapsed insurance policy. It should be understood htat any other documentation with the insured's (customer's) information is contemplated as being within the scope of the present innovation. The system analyzes (such as scans) and extracts data about the policy and/or the customer using optimal quote recognition. The system generates an insurance policy quote using the extracted data. The policy quote is sent to the customer. The customer can accept the quote and bind the insurance policy. A notification and/or commission is sent to the agent upon binding.

In aspects, the subject innovation provides substantial benefits in terms of insurance quotes for customers and agents. One advantage resides in an automated process for small insurance policies. Another advantage resides in promoting consideration of switching carriers by offering fast and easy rate comparisons.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Insurance optimal quote recognition is provided to customers or potential customers seeking insurance. The customer contacts an agent about an insurance policy. The agent provides a system with contact information of the customer. The system sends a link, a notification, and/or the like to the customer via the contact information. The customer follows the link and provides a snapshot, digital version, or other documentation of a present or lapsed insurance policy. It should be understood that any other documentation with the insured's (customer's) information is contemplated as being within the scope of the present innovation. The system analyzes (such as scans) and extracts data about the policy and/or the customer using optimal quote recognition. The system generates an insurance policy quote using the extracted data. The policy quote is sent to the customer. The customer can accept the quote and bind the insurance policy. A notification and/or commission is sent to the agent upon binding.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
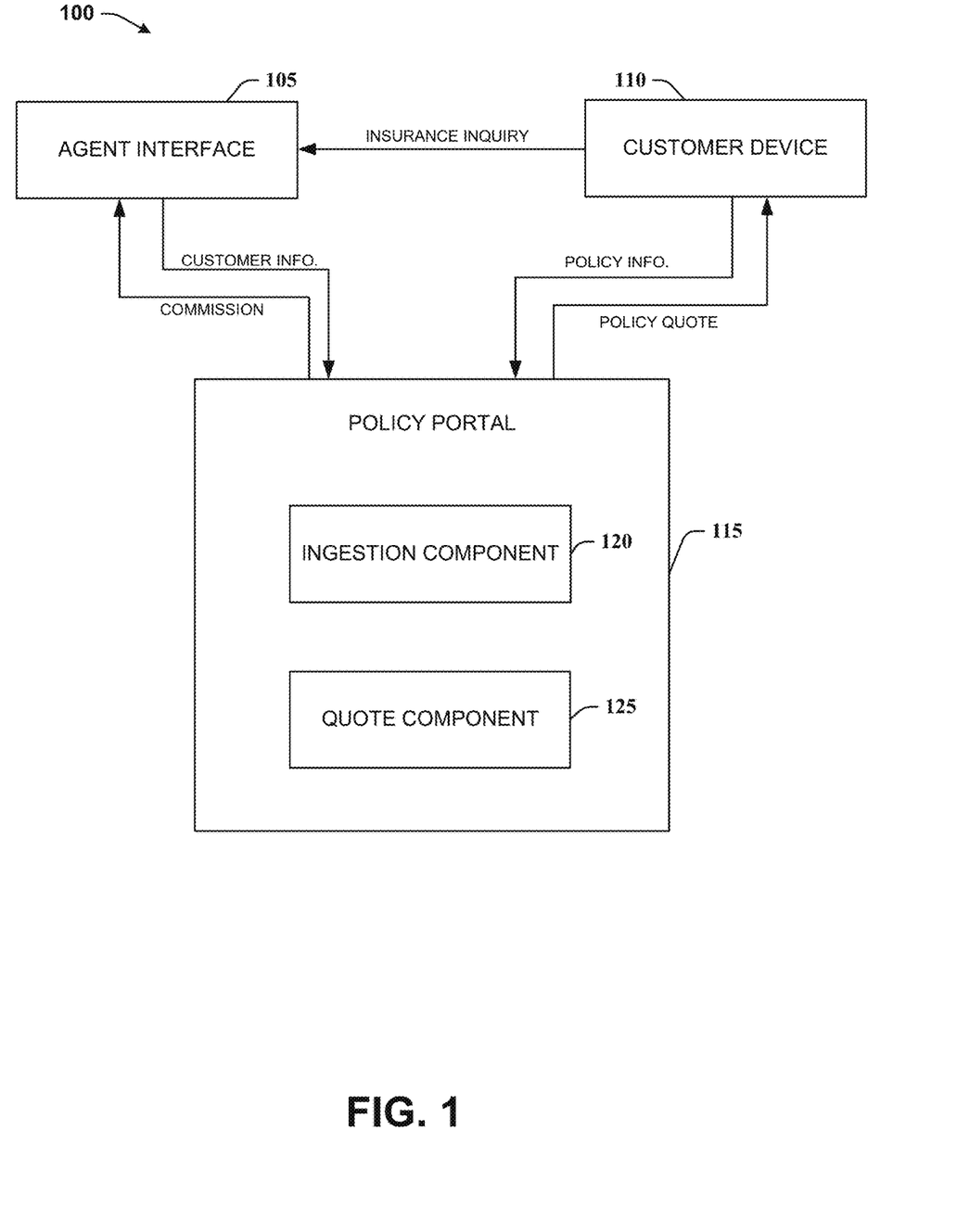
FIG. 1 illustrates a system diagram for optimal insurance quote recognition.

FIG. 1 illustrates a system 100 for insurance optimal quote recognition and matching. The system 100 includes an agent interface 105. The agent interface 105 can be a website, mobile application, agent email, and/or other interface or mode of communication with an insurance agent to sell insurance policies. The agent interface 105 can be accessed or otherwise communicated with by a customer via a customer device 110.

The customer can access the agent interface 105 when shopping or looking for an insurance policy. The customer can provide certain details to the agent interface 105 such as policy type, amount of policy, annual premium, contact information, and/or the like. The agent interface 105 and/or agent associated with the agent interface 105 can use the information to determine whether to engage personally or via the policy portal 115 for providing a policy quote to the customer. For example, if a customer is seeking an insurance policy with an annual premium of less than $5,000.00, the agent may engage, via the agent interface, a policy portal 115. It is appreciated that $5,000.00 is just an example threshold. It is appreciated that other threshold values may be used and/or the agent's personal judgment to triage information.

The policy portal 115 can be an interface, website, mobile application, and/or the like to receive information from customers and/or agents and provide insurance policy quotes for either. In some embodiments, the agent interface 105 can provide the customer's contact information, such as an email to the policy portal 115 when the agent engages with the customer via an automated system or process.

The policy portal 115 can send a notification to the customer device 110. The notification can be an agent branded white label email to the customer device 110. The email can provide a link to the policy portal 115 and/or an ingestion component 120 within the policy portal 115. When the customer follows the link, via the customer device 110, the customer is prompted by the policy portal 115 or the ingestion component 120 to provide a picture or a document regarding the customer's current or previous insurance policy. For example, the customer is seeking insurance, such as but not limited to car insurance, worker's compensation insurance, and the like, and the customer takes a picture on their customer device 110 of their current insurance policy document. In another example, the customer can upload a digital copy of their policy document to the ingestion component 120.

The ingestion component 120 receives the provided information from the customer. The ingestion component 120 can extract data from the picture or provided document. The data can be policy related and/or customer related. For example, the data can be, but not limited to, policy value, coverage level, present insurer, rate, driver license number, vehicle information (year, make, model), payroll documents, declaration pages, and/or the like.

In some embodiments, the policy portal 115 can auto-fill fields in an insurance policy quote information view and provide the view to the customer. The customer can review the auto-filled fields to edit and/or fill in missing fields to complete a quote request. The customer can submit the quote request.

The policy portal 115 includes a quote component 125. The quote component 125 receives the extracted data from the ingestion component 120. The quote component 125 can automatically generate a quote based on the extracted data. The quote can include policy value, price, coverage level, and/or the like. In some embodiments, the policy portal 115 provides the quote to the customer device 110 for review. The quote is bound and sent to the customer for acceptance. The quote can be provided with an acceptance link. When the quote is accepted, the policy portal 115 can facilitate a notification and/or a commission payment to the agent that is forwarded or sent to the agent interface 105.

Figure 2:
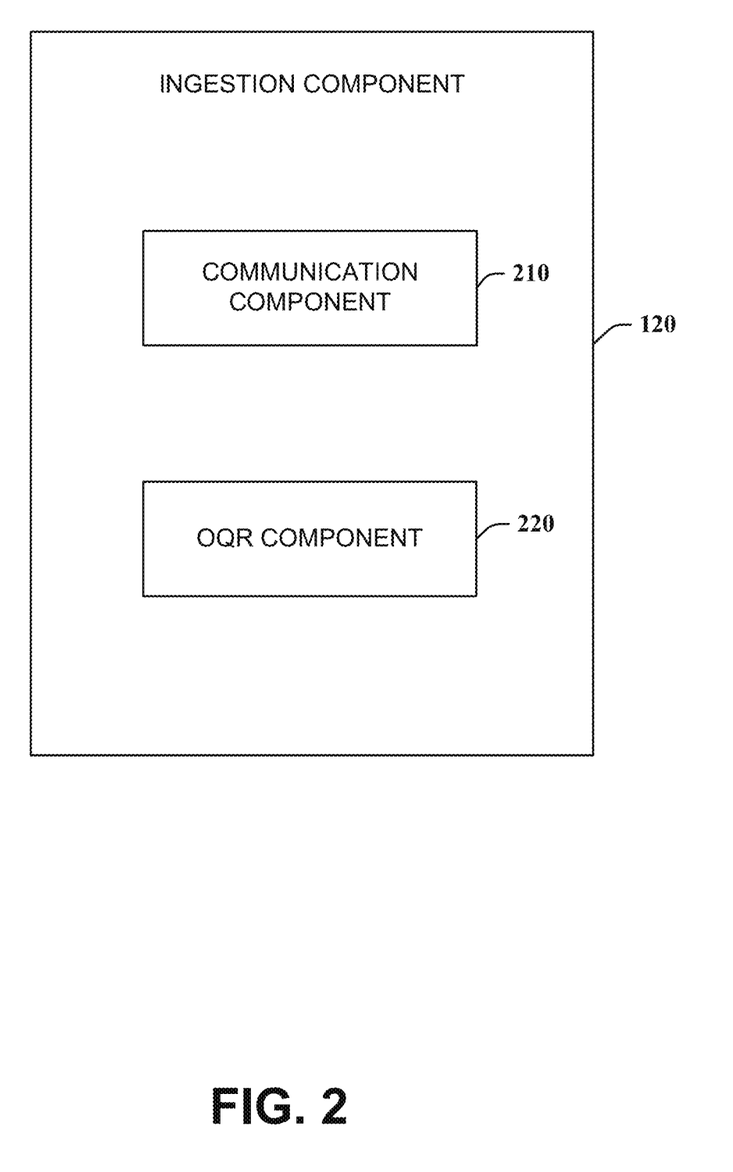
FIG. 2 illustrates an example component diagram of an ingestion component.

FIG. 2 illustrates an example component diagram of an ingestion component 120. The ingestion component 120 includes a communication component 210. The communication component 210 can send a notification to the customer device 110. In some embodiments, the notification can be an agent branded white label email to the customer device 110. The communication or email can provide a link to the policy portal 115 and/or an ingestion component 120 within the policy portal 115.

When the customer follows (e.g. clicks) the link, via the customer device 110, the customer is prompted by the communication component 210 to provide unstructured policy data or an unstructured policy as a customer communication. The unstructured policy can be a picture or a document of or about the customer's current or previous insurance policy. For example, the customer is seeking car insurance, and the customer is prompted to capture an unstructured image or picture using the customer device 110 of their current or lapsed insurance policy document. In another example, the customer can upload a digital copy of their policy document to the communication component 210. In some embodiments, the customer can provide a standardized form that includes insurance details or unstructured policy data. For example, the customer can provide an Association for Cooperative Operations Research and Development (ACORD) form.

The ingestion component 120 includes an optimal quote recognition (OQR) component 220. The OQR component 220 receives the provided information from the customer device 110 via the communication component 210. The OQR component 220 can extract data from the unstructured image or document. In some embodiments, the OQR component 220 analyzes the unstructured policy image to extract data according to an optimal insurance quote recognition algorithm. In some embodiments, the OQR component 220 utilized an optimal character recognition (OCR) technique, a recognition algorithm, machine learning, deep learning, and/or the like to extract data from the policy. In some embodiment, the data can be policy related and/or customer related. For example, the data can be policy value, coverage level, present insurer, rate, driver license number, vehicle information (year, make, model), and/or the like. The OQR component 220 can provide the data to the quote component 125 for generating an insurance policy quote based on the extracted (or recognized) data.

Figure 3:
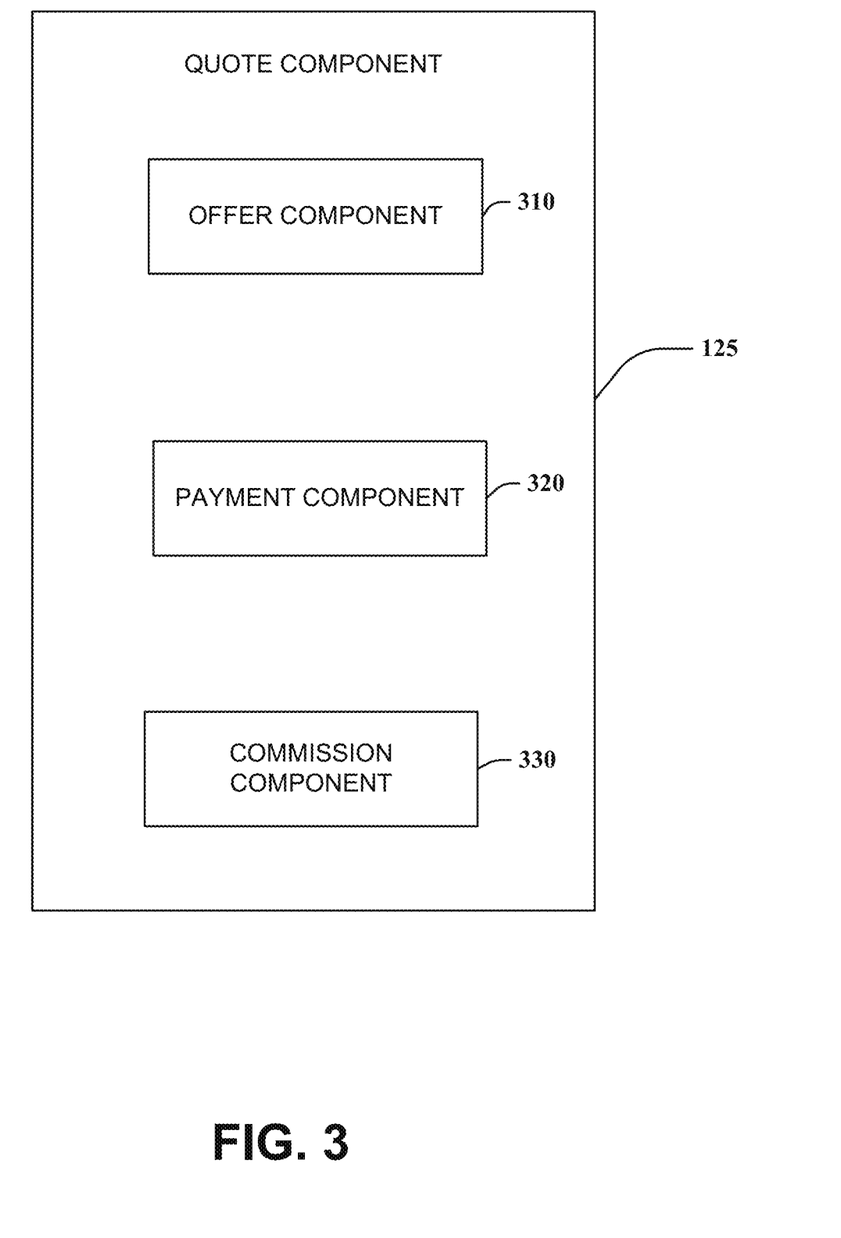
FIG. 3 illustrates an example component diagram of a quote component.

FIG. 3 illustrates an example component diagram of a quote component 125. The quote component 125 includes an offer component 310. The offer component 310 generates an insurance policy quote offer for the customer based on the extracted or recognized data. In some embodiments, the offer component 310 can auto-fill fields in an insurance policy quote information view or application. In some embodiments, the offer component 310 provides the view to the customer. The customer can review the auto-filled fields to edit and/or fill in missing fields to complete a quote request. The customer can submit the quote request.

In other embodiments, the offer component 310 includes a quote component 125. The offer component 310 receives the extracted data from the OQR component 220. The offer component 310 can automatically generate a quote based on the extracted data. The quote can include policy value, price, coverage level, and/or the like. The offer component 310 provides the quote to the customer device 110 for review. The quote is bound and sent to the customer for acceptance. The quote can be provided with an acceptance link. After the quote is accepted, the quote component 125 can facilitate a notification and/or a commission payment to the agent that is forwarded or sent to the agent interface 105.

The quote component 125 includes a payment component 320. Upon acceptance of the quote, the payment component 320 facilitates payment from the customer to the insurer to purchase the insurance policy associated with the policy quote. The payment component 320 can send a request or bill to the customer and/or the customer device 110. The payment component 320 can receive payment information from the customer to provide payment of the insurance policy quote. The payment component 320 processes the payment according to the payment information.

Upon receiving payment for the insurance policy, the commission component 330 calculates and provides a commission payment to a submitting agent. The submitting agent is an insurance agent associated with the insurance carrier and/or the agent interface 105. The commission component 330 can calculate the commission as a flat fee or percentage of the payment amount, policy value, and/or the like.

In an example embodiment, the policy portal 115 can be an optical character reader (OCR) technique offered and deployed on an insurance provider website for insurance agents to utilize to secure a policy quote (e.g. a rate indication). The customer can upload an existing or lapsed policy (e.g. a competitor's policy) to produce a competitive policy quote. This policy portal 115 can be a tool for insurance agents to identify new business opportunities with the insurance provider.

In the example embodiment, the policy portal 115 can use an OQR or OCR technique deployed within the insurance provider's online environment or system (e.g. policy portal 115). The policy portal 115 secures competitor's work comparative policies from a customer and identifies the fields of information in the competitors policies used to quote a policy. The OQR or OCR technique extracts the information into fields and runs that information through the insurance provider's carrier rate structure to produce a policy quote.

The insurance provider can provide a close rate comparison between the incumbent carrier's policy and the insurance provider such that the insurance provider can bind new policies from the competition for appointed insurance agents. In some embodiments, the policy quote can apply on single policies, or on book rolls. In some embodiments, an agent can create the submission in the policy portal 115 (e.g. insurance provider website) and complete forms and applications to support the underwriting process.

In another exemplary embodiment, a first component leverages existing insurance policy documents that already contains the consumer and business information that will be used to underwrite a new insurance policy. A mobile phone with a 'mobile web' or 'mobile application' can be used to capture an image of the existing policy. A user interface can be used to instruct the consumer as to how to capture a picture or scan of the documents. Once that document is captured, a unique identifier can be assigned to the image associating the specific captured images to a specific account that is being quoted. In some embodiments, the images are transferred to a separate hosted server. A recognition process or algorithm (e.g. OQR or OCR recognition) can identify the type of document being submitted and recognize 'unstructured data' and convert it into digital data. The digital data can be sent back to the insurance provider servers and is submitted with all the relevant information to a quote component (e.g. a pricing & rating engine) and a price indication or quote is generated. The quote can be submitted either to the agent to distribute to the customer or sent directly to the customer.

In the example embodiment, the policy portal provides extraction of data directly from the customer, by either taking a picture from a mobile phone, or dragging and dropping a digital document from a desktop or tablet to submit a policy directly to an insurance agent or a carrier or insurance provider. The policy portal can extract from a commercial insurance agent, either for their own workflow, or as a capture process sent to their customers (end users), to enter existing policies for renewal or quote new policy business. The policy portal provides benefit in fast and efficient "Book Rolls", rather than manually re-entering thousands of policies, or mapping out complex data extractions and imports. In some embodiments, the policy portal provides agents to drag and drop a complete file/folder of many policies and the system extract the information using OQR, and create a workflow.

In some embodiments, the policy portal provides a mode to use images of policies which are typically characterized as unstructured data and convert the policies into a structured format to be submitted to a rating system to generate a policy quote. In some embodiments, the policy portal allows insurance providers, in conjunction and cooperation with insurance systems, and/or marketing and/or distribution partners (e.g. a point of sale system) such that customers can have 'folders' or 'wallets' where they store insurance documents. Such folders can be accessed, rated and quoted, without action taken on the part of the potential customer.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Among other things, such components can automate certain mechanisms or processes performed thereby to make portions of the systems and methods more adaptive as well as efficient and intelligent. By way of example, and not limitation, such mechanisms can be utilized by the system 100 for insurance optimal quote recognition.

Figure 4:
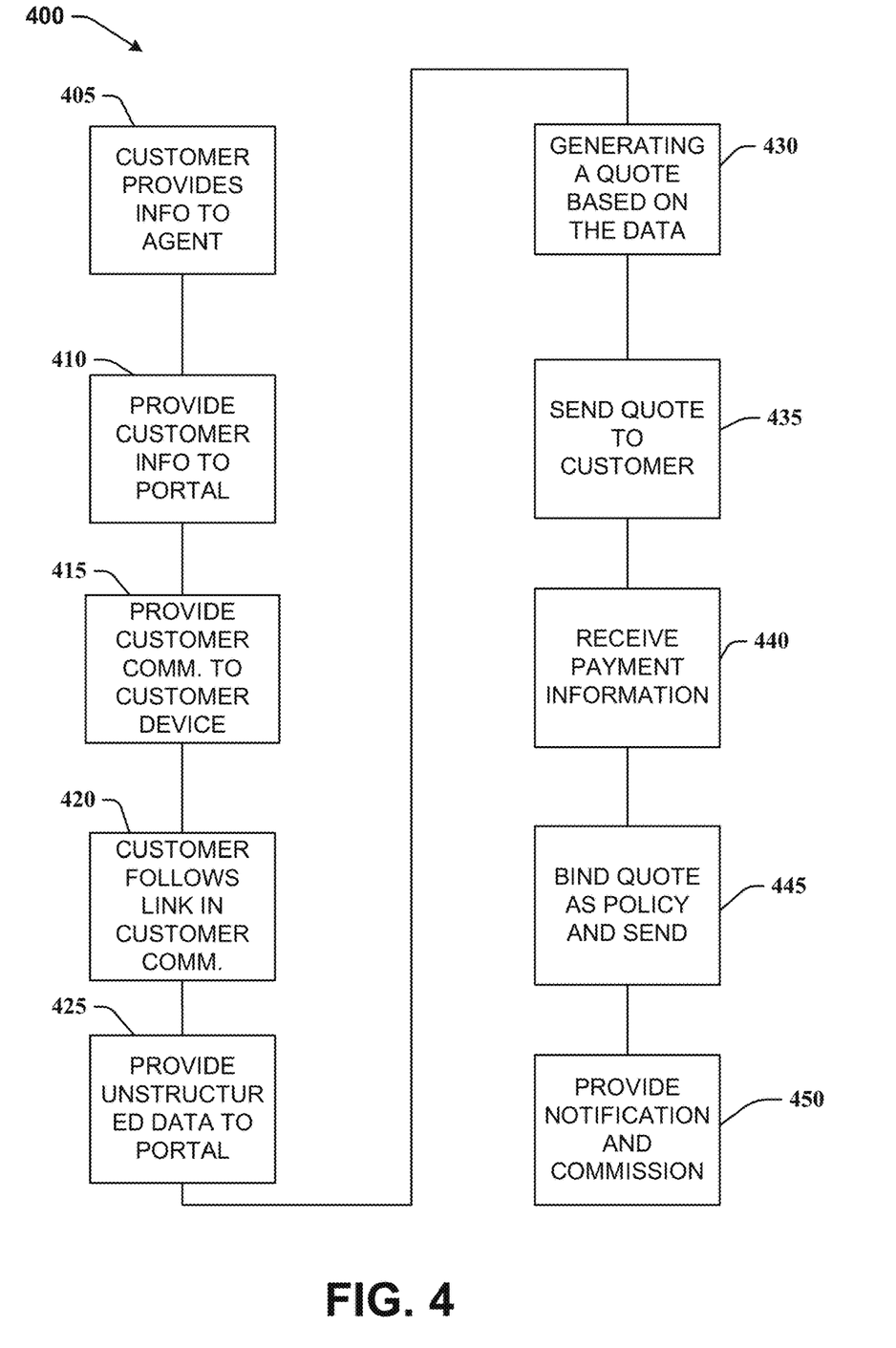
FIG. 4 illustrates a method for optimal insurance quote recognition.

In view of the exemplary systems described above, methods that may be implemented in accordance with the disclosed subject matter will be better appreciated with reference to flow chart diagram of FIG. 4. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 4 illustrates a method 400 for insurance optimal quote recognition. At 405, a customer that is insured by a competitor approaches an agent for a small (e.g. less than five thousand dollar) policy. The customer can provide contact information, policy information, and/or the like to the agent. At 410, the agent provides some or all of the customer contact information to a policy portal. For example, the agent receives a text message from a mobile phone number of a customer about a new policy. The agent can input the mobile phone number in the portal to initiate an automated process for insurance optimal quote recognition. At 415, the portal sends an automated notification or invite to the customer using the provided contact information (e.g. the mobile phone number provided at 410. The notification can include a link for which the customer may enter to gain access to the portal.

At 415, the customer receives the notification with the link on their mobile phone via text message, and/or the like. At 420, the customer opens or follows the link. The link connects the customer to the portal and provides instructions or prompts the customer to provide their current policy obtained from a competitor. The customer can be prompted to take a picture of their policy or provide a digital copy of the policy. At 425, the customer provides or sends the policy to the portal (e.g. takes a picture, scans and uploads the policy, uploads a digital copy, and/or the like). The policy is analyzed to extract data regarding the policy. The data extracted can be policy amount, coverage, rate, term, customer information, and/or the like. The analysis can be optimal quote recognition algorithm that parses and extracts data pertinent to insurance policies and/or the like.

At 430, the portal queries an insurance provider with the extracted data. For example, the portal can send the extracted data about the current policy to an insurance provider associated with the agent. For example, the data can be sent via an application programming interface (API) call and response to an insurance provider system that can provide quotes and rates according to submitted data. At 435, a quote is sent to the customer. The quote is generated based on the extracted data that is provided at 430. The quote is sent in a text message, email, and/or the like. Along with the quote, the communication can request further information be provided to complete the quote and generate a binder of insurance.

At 440, the customer is prompted to complete any further information and/or choose and provide payment information such as a credit card, debit card, account number, and/or other payment method. At 445, upon receiving the further information and/or payment information the quote is bound and sent to the customer as their insurance policy. At 450, a notification and/or commission payment is sent to the agent upon the binding and purchase of an insurance policy by the customer.

Figure 5:
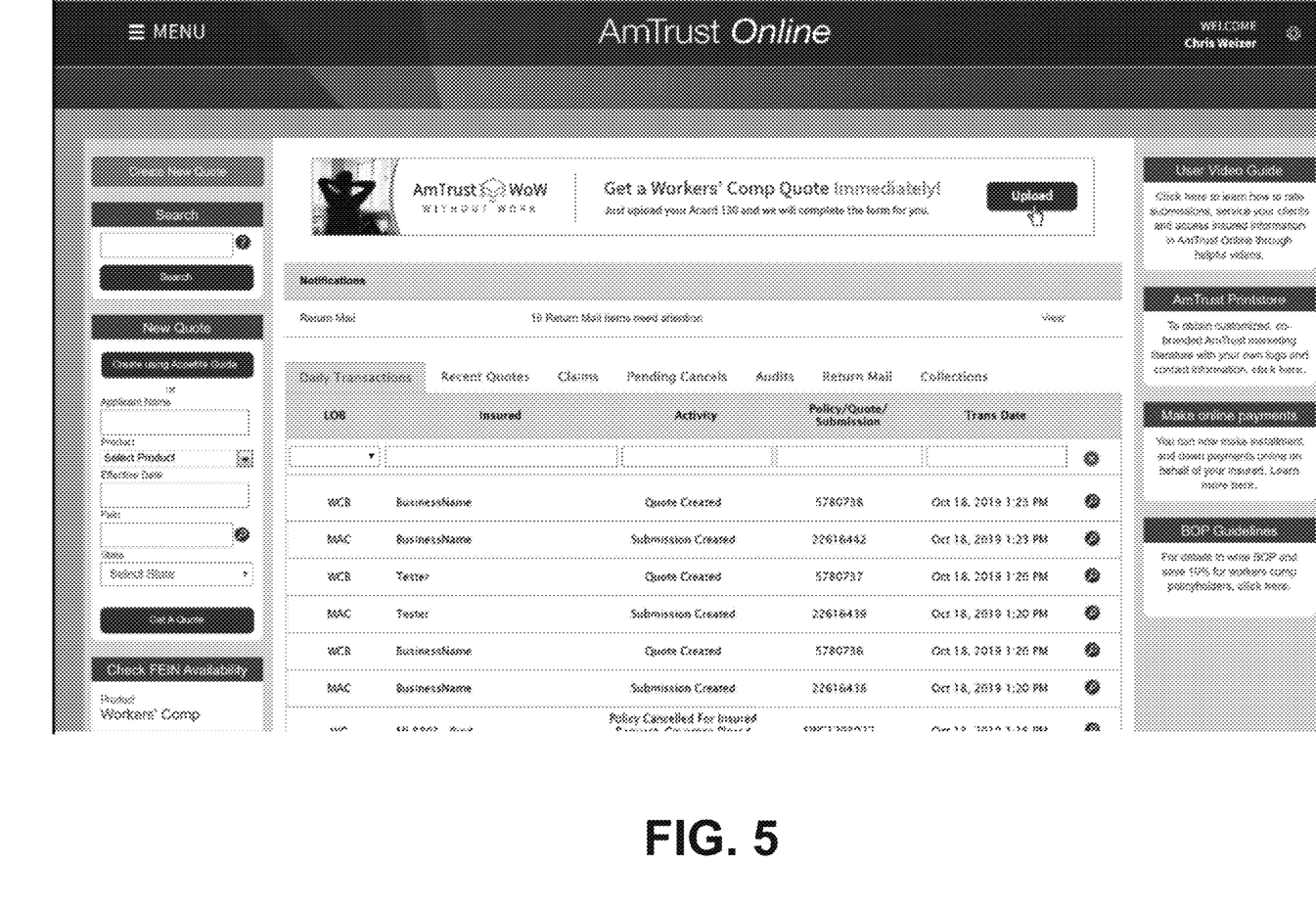
FIG. 5 illustrates a starting view presented by the policy portal.
Figure 6:
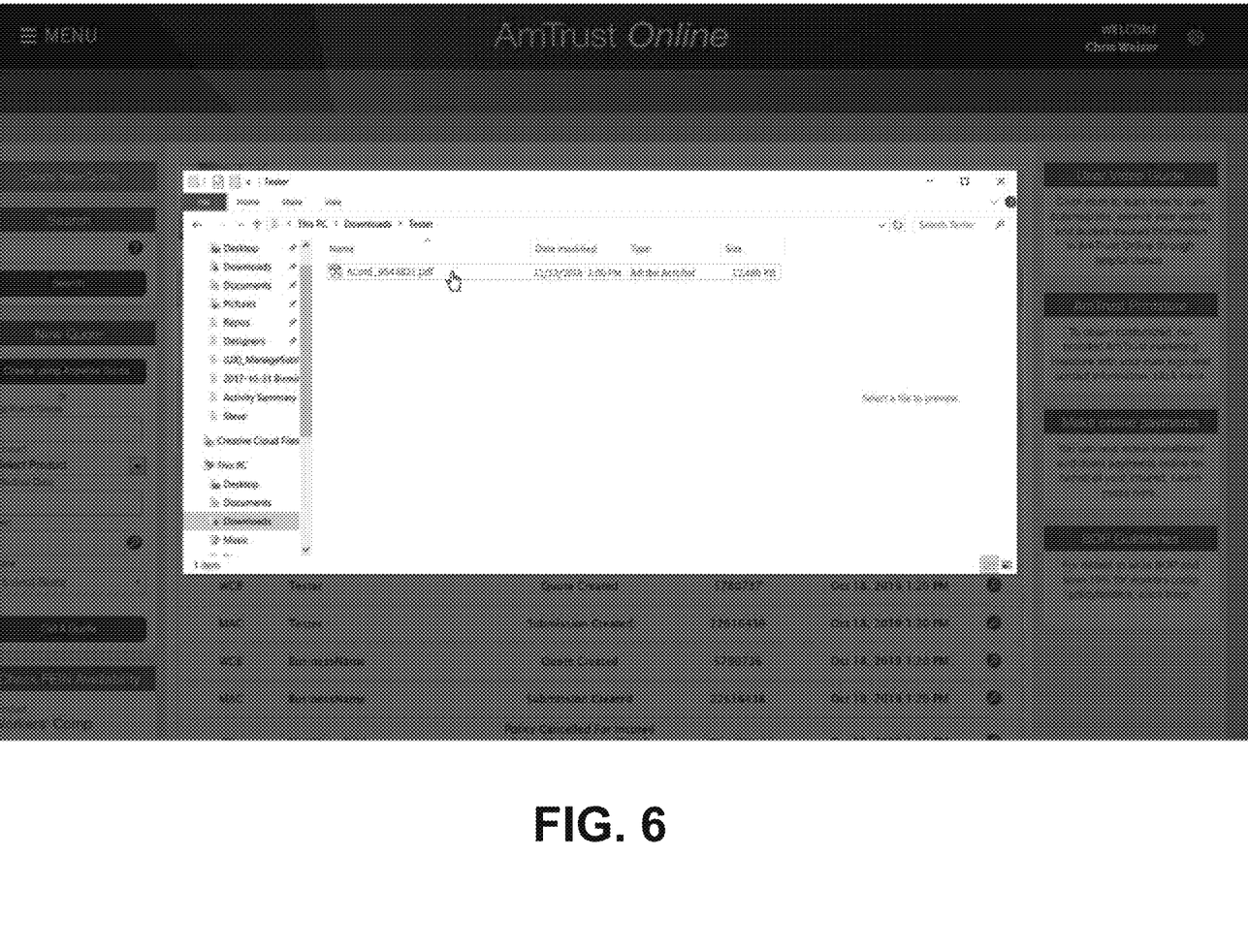
FIG. 6 illustrates an upload view presented by the policy portal.
Figure 7:
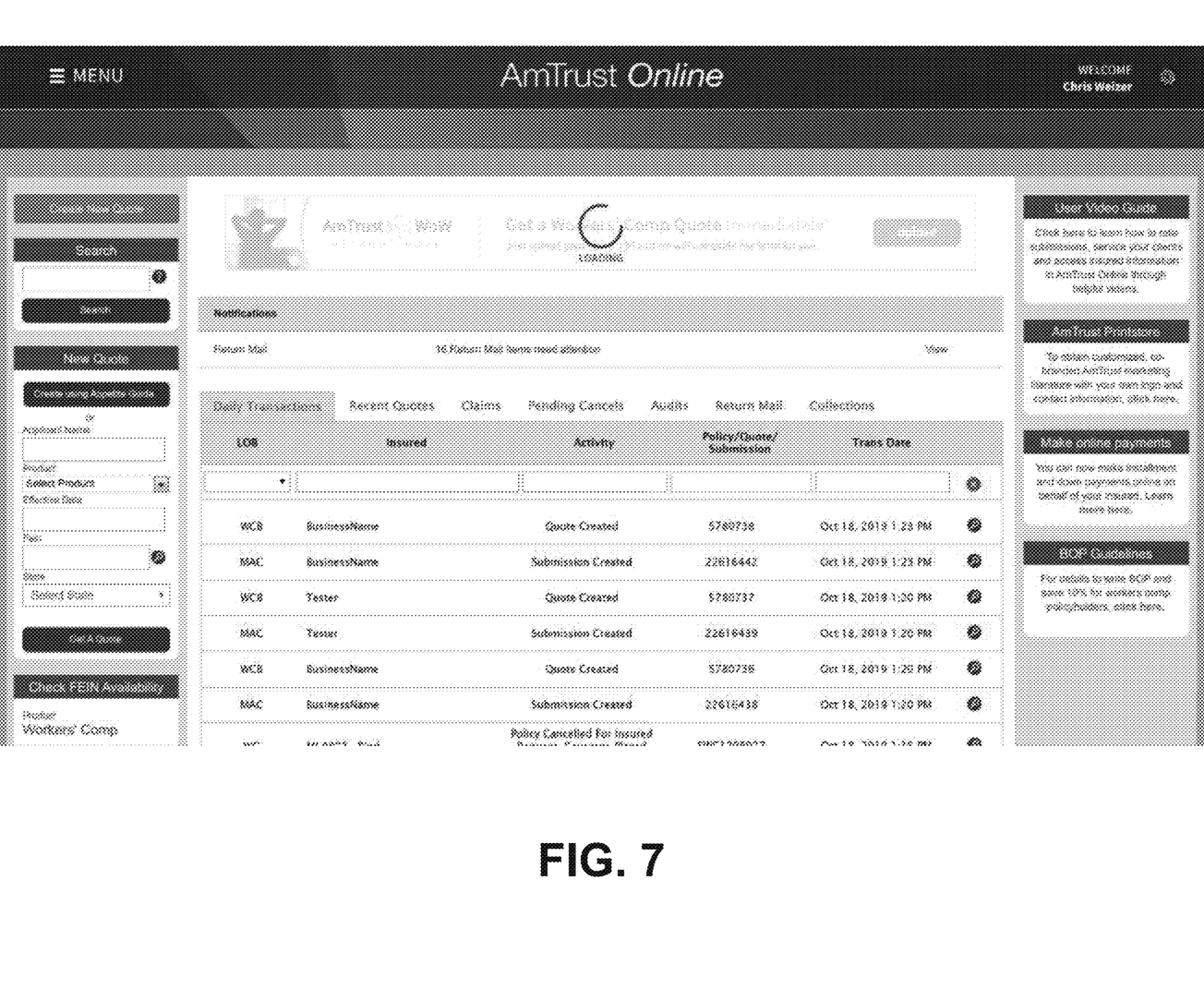
FIG. 7 illustrates a loading view presented by the policy portal.
Figure 8:
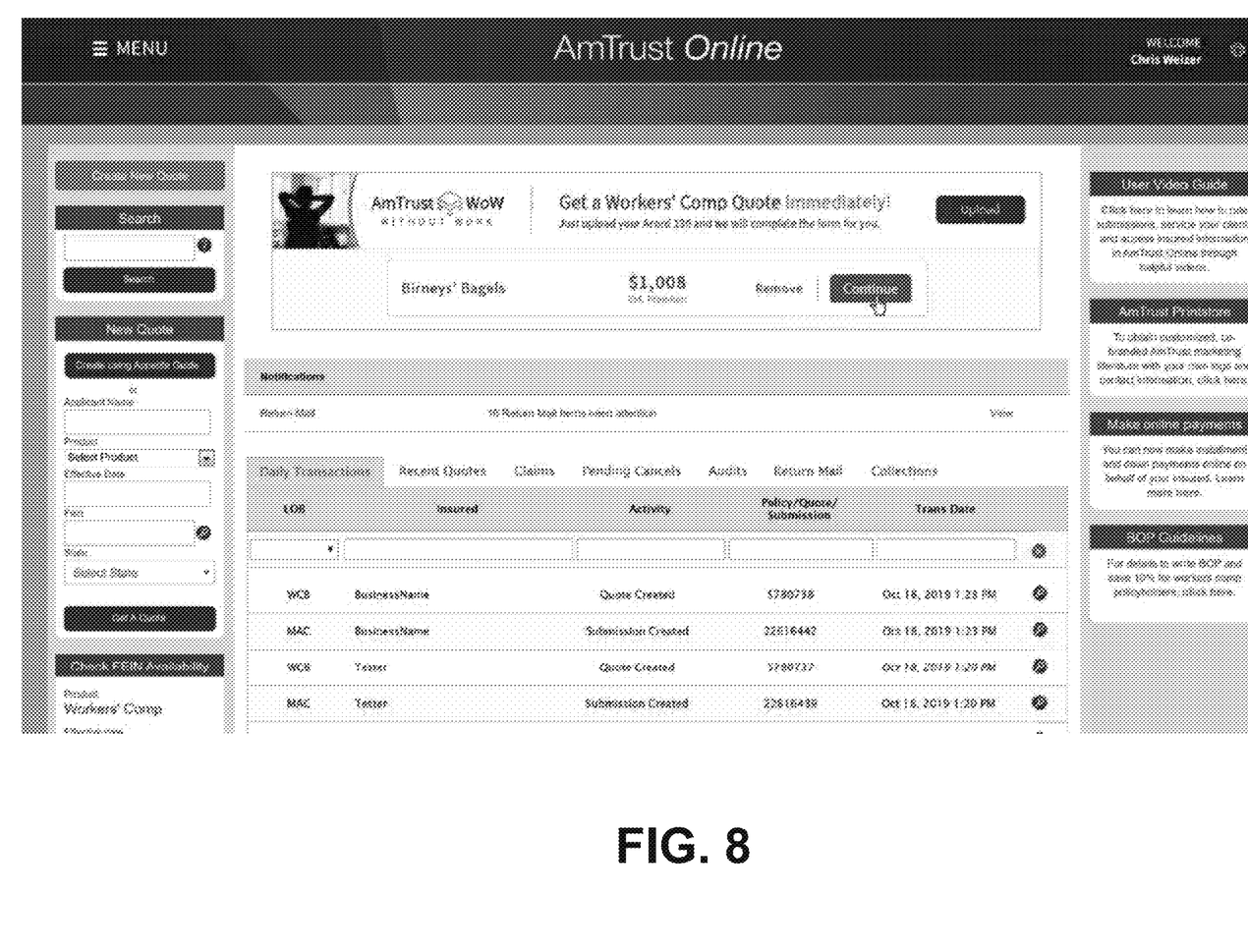
FIG. 8 illustrates a quote view presented by the policy portal.
Figure 9:
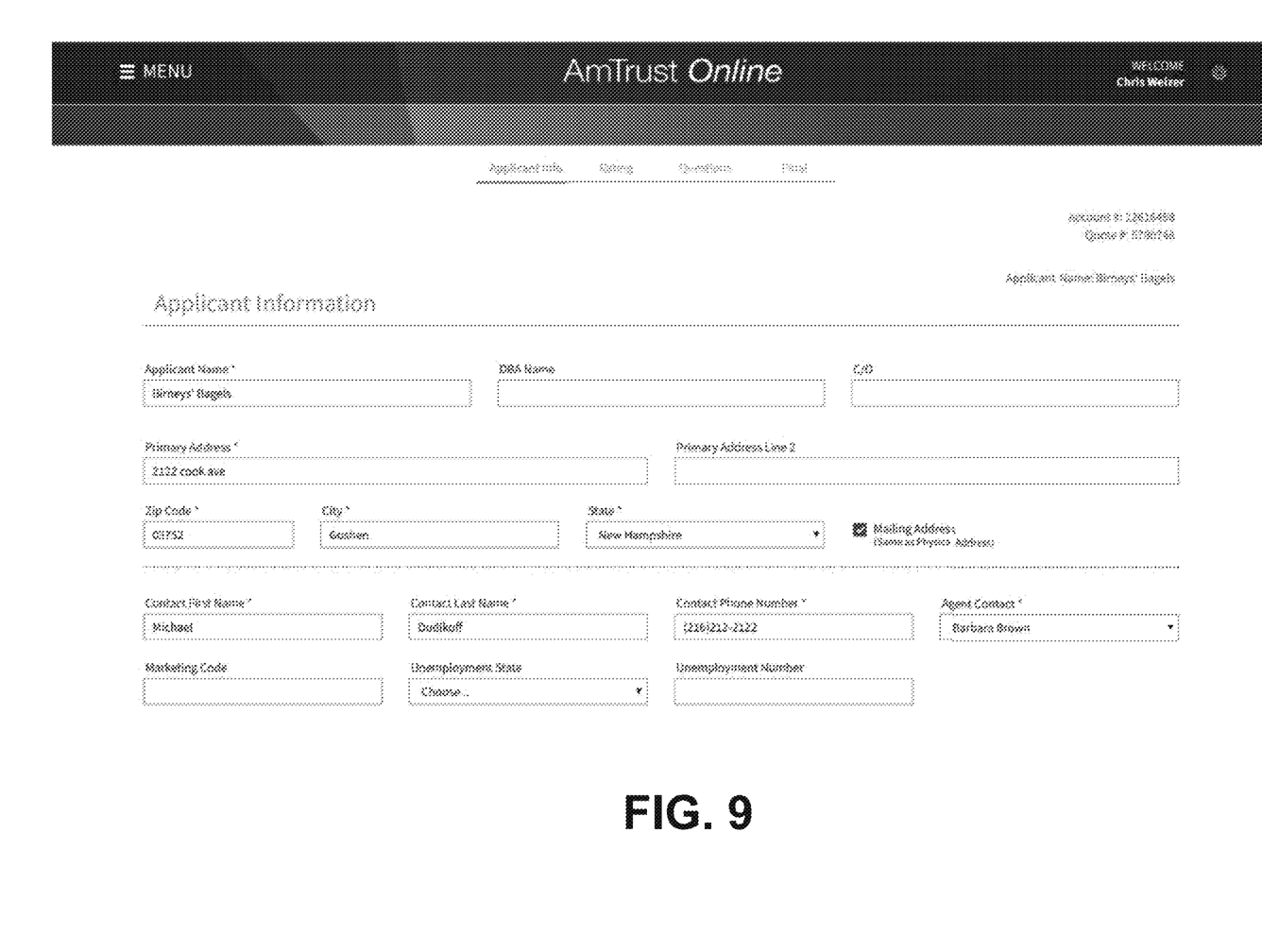
FIG. 9 illustrates an auto-filled policy application view presented by the policy portal.

FIG. 5 illustrates a starting view presented by the policy portal. The customer can access the policy portal and be presented with the starting view on their customer device 110. FIG. 6 illustrates an upload view presented by the policy portal. The customer can be presented with an option to upload or capture and image of a policy document having unstructured data related to the policy. FIG. 7 illustrates a loading view presented by the policy portal. The customer provides the policy and the policy portal presents a loading view while OQR is performed on the provided policy and a quote is generated. FIG. 8 illustrates a quote view presented by the policy portal. The policy portal provides a policy quote to the customer. FIG. 9 illustrates an auto-filled policy application view presented by the policy portal. The customer can review the policy quote and provide additional information to further refine the policy quote before binding.

A method, comprising: providing customer information to an a policy portal; sending a communication to the customer based on the customer information, wherein the communication provides access the policy portal: receiving an unstructured policy data from the customer via the portal: and generating and sending an insurance policy quote to the customer, wherein the insurance policy quote is based on the unstructured policy.

A system, comprising: an agent interface that receives customer information from a customer; a policy portal that sends a communication to the customer based on the customer information, wherein the communication provides access the policy portal: an ingestion component that receives an unstructured policy from the customer via the portal: and a quote component that generates and sends an insurance policy quote to the customer, wherein the insurance policy quote is based on the unstructured policy.

A computer readable medium having instructions to control one or more processors configured to: provide customer information to an a policy portal: send a communication to the customer based on the customer information, wherein the communication provides access the policy portal: receive an unstructured policy data from the customer via the portal; and generate and send an insurance policy quote to the customer, wherein the insurance policy quote is based on the unstructured policy.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
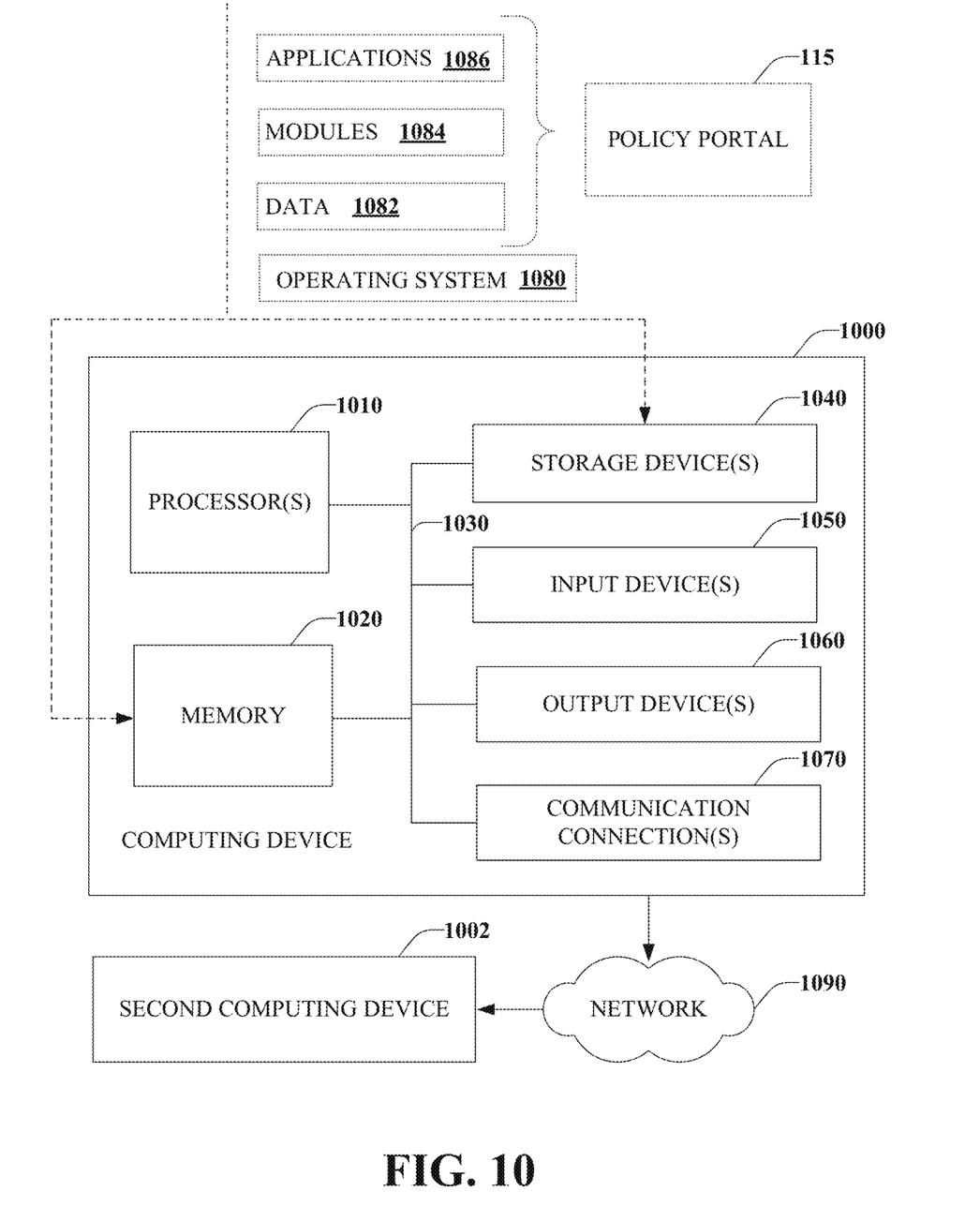
FIG. 10 illustrates a computing environment where one or more of the provisions set forth herein can be implemented, according to some embodiments.

To provide a context for the disclosed subject matter, FIG. 10 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer executable actions, instructions, and or components stored in the memory 1020.

The processor(s) 1010 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations with respect to digital image processing and computer graphics.

The computing device 1000 can include or otherwise interact with a variety of computer-readable media to facilitate control of the computing device to implement one or more aspects of the disclosed subject matter. The computer-readable media can be any available media that accessible to the computing device 1000 and includes volatile and non-volatile media, and removable and non-removable media. Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1000, such as during start-up, can be stored in nonvolatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, cloud storage, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the policy portal 115 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the policy portal 115 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth . . . ), or a combination thereof.

The computing device 1000 can also include communication connection(s) 1070 to enable communication with at least a second computing device 1002 by means of a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. For example, the computing device 1000 can correspond to a server that executes functionality of policy portal 115, and the second computing device 1002 can be a user device that communications and interacts with the computing device 1000.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
executing, on a processor, instructions that cause the processor to perform operations associated with data cleansing, the operations comprising:
receiving customer information from a customer through an agent interface over a computer network by a policy portal hosted on a server;
automatically sending, by the server, a communication to a customer device in accordance with the customer information received from the agent interface, wherein the automated communication comprises a link providing access to the policy portal;
generating, via the policy portal, at least one visual prompt on the customer device to upload a customer's unstructured image of a current policy;
receiving a customer communication from the customer regarding a potential insurance policy quote, wherein the customer communication comprises the customer's unstructured image of the current policy by the policy portal of the server over the computer network in response to the at least one visual prompt, the customer's unstructured image including unstructured policy data of the current policy associated with the customer;
analyzing, by the server, the customer's unstructured image to extract structured data in accordance with an optimal insurance quote recognition algorithm, said structured data comprising at least one of policy price, coverage level, present insurer, rate, driver license number, property information, appraisal, vehicle information, payroll information, declarations pages, or standardized forms;
processing, by the server, the structured data to generate an insurance policy quote;
sending the structured data to an insurance provider system;
determining, by the server, that a determined policy value of the generated insurance policy quote does not exceed a maximum policy value threshold; and
sending, via the insurance provider system, the insurance policy quote to the customer device, based on at least the determination that the determined policy value does not exceed the maximum policy value threshold.

2. The method of claim 1, comprising:
receiving payment information from the agent interface to provide payment of the insurance policy quote;
processing the payment according to the payment information; and
calculating and providing a commission payment to a submitting agent.

3. The method of claim 1, comprises:
completing an insurance policy application for the customer based on the extracted data, and
binding the insurance policy quote based on the insurance policy application.

4. A system, comprising:
a processor coupled to a memory that includes instructions that, when executed by the processor, cause the processor to:
enable an agent interface that receives customer information from a customer device over a computer network by a policy portal hosted on a server;
enable the policy portal that automatically sends a communication to the customer device, wherein the automated communication comprises a link providing access to the policy portal;
enable the generation of at least one visual prompt on the customer device via the policy portal to upload a customer's unstructured image of a current policy;
enable an ingestion component that receives a customer communication from the customer regarding a potential insurance policy quote, wherein the customer communication comprises the customer's unstructured image of the current policy by the policy portal of the server over the computer network in response to the at least one visual prompt, the customer's unstructured image including unstructured policy data of the current policy associated with the customer;
enable an optimal quote recognition (OQR) component that analyzes the customer's unstructured image to extract structured data in accordance with an optimal insurance quote recognition algorithm, said structured data comprising at least one of policy price, coverage level, present insurer, rate, driver license number, property information, appraisal, vehicle information, payroll information, declarations pages, or standardized forms;
enable a quote component that:
sends, via the policy portal, the structured data to an insurance provider system to generate an insurance policy quote based on the extracted data bridging to the insurance policy quote; and
enable a server to:
determine that a determined policy value of the generated insurance policy quote does not exceed a maximum policy value threshold; and
send the insurance policy quote, via the insurance provider system, to the customer device, based on at least the determination that the determined policy value does not exceed the maximum policy value threshold.

5. The system of claim 4, wherein the ingestion component comprises:
a communication component that receives the customer communication from the customer regarding a potential insurance policy quote, wherein the communication includes the unstructured policy.

6. The system of claim 4, wherein the quote component comprises:
a payment component that:
receives payment information from the customer to provide payment of the insurance policy quote;
processes the payment according to the payment information; and
a commission component that calculates and provides a commission payment to a submitting agent.

7. The system of claim 4, wherein the quote component comprises:
an offer component that:
completes an insurance policy application for the customer based on the extracted data, and
binds the insurance policy quote based on the insurance policy application.

8. A non-transitory computer readable medium having instructions to control one or more processors configured to:
receive customer information from an agent interface over a computer network by a policy portal hosted on a server;
automatically send a communication to a customer associated with a customer device in accordance with the customer information received from the agent interface, wherein the automated communication comprises a link providing access the policy portal;
generating, via the policy portal, at least one visual prompt on the customer device to upload a customer's unstructured image of a current policy;
receive a customer communication from the customer regarding a potential insurance policy quote, wherein the customer communication comprises the customer's unstructured image of the current policy by the policy portal of the server over the computer network in response to the at least one visual prompt, the customer's unstructured image including unstructured policy data associated with the customer;
analyze the customer's unstructured image to extract structured data, said structured data comprising at least one of policy price, coverage level, present insurer, rate, driver license number, property information, appraisal, vehicle information, payroll information, declarations pages, or standardized forms; and
send the structured data to an insurance provider system;
generate an insurance policy quote to the customer, wherein the insurance policy quote is based on the structured data;
determine a policy value of the generated insurance policy quote;
determine to send the insurance policy quote to the customer device based on a comparison of a threshold to the customer information that the determined policy value does not exceed a maximum policy value threshold; and
send the insurance policy quote to the customer via insurance provider system.

9. A method, comprising:
executing, on a processor, instructions that cause the processor to perform operations associated with data cleansing, the operations comprising:
receiving customer information from an agent interface over a computer network by a policy portal hosted on a server;
automatically sending, by the server, a communication to a customer device in accordance with the customer information received from the agent interface, wherein the communication comprises a link providing access to the policy portal;
generating, via the policy portal, at least one visual prompt on the customer device to upload a customer's unstructured image of a current policy;
receiving a customer communication from the customer regarding a potential insurance policy quote, wherein the customer communication comprises the customer's unstructured image of the current policy by the policy portal of the server over the computer network in response to the at least one visual prompt, the customer's unstructured image including unstructured policy data of the current policy associated with the customer;
analyzing, by the server, the customer's unstructured image to extract structured data in accordance with an optimal insurance quote recognition algorithm, said structured data comprising at least one of policy price, coverage level, present insurer, rate, driver license number, property information, appraisal, vehicle information, payroll information, declarations pages, or standardized forms;

processing, by the server, the structured data to generate an insurance policy quote;

sending the structured data to an insurance provider system;

determining, by the server, that a determined policy value of the generated insurance policy quote does not exceed a maximum policy value threshold; and sending, via the insurance provider system, the insurance policy quote to the customer device, based on at least the determination that the determined policy value does not exceed the maximum policy value threshold.

* * * * *